United States Patent [19]
Cetinkaya

[11] Patent Number: 4,861,459
[45] Date of Patent: Aug. 29, 1989

[54] LOW PRESSURE MIXING PROCESS FOR ATOMIZING FLUIDS
[75] Inventor: Ismail B. Cetinkaya, Palatine, Ill.
[73] Assignee: UOP Inc., Des Plaines, Ill.
[21] Appl. No.: 5,044
[22] Filed: Jan. 16, 1987
[51] Int. Cl.$^4$ .......................... C10G 11/18; B01J 8/18
[52] U.S. Cl. ................................. 208/157; 208/113
[58] Field of Search ................ 208/113, 153, 157, 164

[56] References Cited
U.S. PATENT DOCUMENTS

| | | | |
|---|---|---|---|
| 2,985,517 | 5/1961 | Harper | 208/164 X |
| 3,071,540 | 1/1963 | McMahon et al. | 208/157 |
| 3,654,140 | 4/1972 | Griffel et al. | 208/113 |
| 4,097,243 | 6/1978 | Bartholic | 208/164 X |
| 4,422,925 | 12/1983 | Williams et al. | 208/75 |
| 4,434,049 | 2/1984 | Dean et al. | 208/157 X |
| 4,562,046 | 12/1985 | Hays et al. | 208/157 X |
| 4,650,560 | 3/1987 | Buyan et al. | 208/157 |

Primary Examiner—Glenn Caldarola
Attorney, Agent, or Firm—Thomas K. McBride; John G. Tolomei

[57] ABSTRACT

The liquid feed injector as hereindescribed uses sequential stages of increased severity mixing to fully atomize a liquid portion of a combined liquid and gaseous stream. Sequential mixing consists of a first mild mixing that takes place in a mild mixing zone and blends the liquid and gaseous material into a substantial uniform mixture. The uniform mixture of liquid and gaseous material passes through another stage of vigorous mixing where the liquid is sheared and gas is dispersed throughout the liquid to produce a homogeneous mixture of fine gas bubbles dispersed in the liquid. The homogeneous liquid and gas mixtures are then discharged through one or more discharge nozzles to effect atomization and distribution of the liquid in a suspension of fluidized solids. The sequential stages of increased severity mixing allow atomization of the liquid into fine droplets with a reduced pressure drop across the discharge nozzles. In a highly preferred form, the liquid injector includes provisions for injecting two fluid streams into a suspension of fluidized solids at two discrete locations.

11 Claims, 4 Drawing Sheets

LOW PRESSURE MIXING PROCESS FOR ATOMIZING FLUIDS

BACKGROUND OF THE INVENTION

1. Field of the Invention

This invention relates generally to the dispersing of liquids into fluidized solids. More specifically this invention relates to a method and apparatus for atomizing liquid into fine droplets and dispersing the droplets into a suspension of fluidized solids. A specific aspect of this invention relates to the contacting of fluidized catalyst particles with a liquid hydrocarbon wherein the liquid hydrocarbon is atomized into a dispersion of fine droplets to improve the contact between the hydrocarbon and catalyst.

2. DESCRIPTION OF THE PRIOR ART

It has been a long recognized objective in the dispersal of fluid streams into fluid particle suspensions to deliver the liquid in small droplets. The small droplets increase interaction between the liquid and solid. Catalytic conversion of hydrocarbon streams using a fluidized stream of solid catalyst particles poses a typical example where small droplets are needed. Preferably, in hydrocarbon conversion droplet sizes become small enough to permit vaporization of the liquid before it contacts the solids.

It is well known that agitation or shearing can atomize a liquid hydrocarbon feed into fine droplets which are then directed at the fluidized solid particles. A variety of methods are known for shearing such liquid streams into fine droplets.

U.S. Pat. No. 3,071,540 discloses a feed injection apparatus for a fluid catalytic cracking unit wherein a high velocity stream of gas, in this case steam, converges around the stream of oil upstream of an orifice through which the mixture of steam and oil is discharged. Initial impact of the steam with the oil stream and subsequent discharge through the orifice atomizes the liquid oil into a dispersion of fine droplets which contact a stream of coaxially flowing catalyst particles.

U.S. Pat. No. 4,434,049 shows a device for injecting a fine dispersion of oil droplets into a fluidized catalyst stream wherein the oil is first discharged through an orifice onto an impact located within a mixing tube. The mixing tube delivers a cross flow of steam which simultaneously contacts the liquid. Combined flow of oil and steam exit the conduit through an orifice which atomizes the feed into a dispersion of fine droplets and directs the dispersion into a stream of flowing catalyst particles.

The injection devices of the '540 and '049 patents rely on relatively high fluid velocities and pressure drops to achieve atomization of the oil into fine droplets. Providing this higher pressure drop burdens the design and increases the cost of equipment such as pumps and exchangers that are typically used to supply liquid and gas to the feed injection device. The need to replace such equipment may greatly increase the cost of retrofitting an existing liquid-solid contacting installation with such an injection apparatus.

Figure 2:
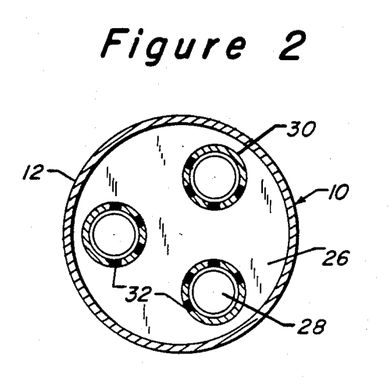

Other methods for atomizing liquid feeds with gaseous materials are shown in U.S. Pat. Nos. 3,152,065 and 3,654,140. FIG. 2 of U.S. Pat. No. 3,654,140 shows an injection device that imparts a tangential velocity to an oil stream to promote its mixing with a stream of steam which is injected into the oil outside the injection device. In U.S. Pat. No. 3,152,065 an injection device adds a tangential velocity to an annular stream of oil that flows around a central conduit. Steam passing through the center conduit contacts the oil at the distal end of injector. Steam and oil then pass through an orifice which further atomizes the oil and distributes it into a dispersion of fine droplets. In these devices, the tangential velocity of oil in combination with the expansion of the steam is relied on to provide the energy for atomizing the oil.

SUMMARY OF THE INVENTION

It is an object of this invention to provide a method and apparatus for atomizing liquid and dispersing the liquid into a suspension of solid particles without excessive pressure drop.

It is a further object of this invention to provide an atomizing and dispersing method and apparatus that is easily incorporated into existing liquid solid contacting zones.

These objectives are achieved by combining a liquid and gaseous stream under conditions of sequentially increased mixing severity prior to introducing the liquid and gaseous streams into a suspension of fluidized particles. More specifically, the liquid and gaseous components are sequentially mixed, first in a mild zone that blends the liquid and gaseous components to a uniform consistency. The liquid and gaseous blend is transported to the next zone in a manner that will not resegregate the components. The next mixing stage is of higher severity in that it vigorously mixes the liquid and gaseous blend by impinging it against another contact surface to shear the liquid and promote the formation of fine bubbles within the liquid and gaseous mixture. This mixture of liquid and finely dispersed bubbles are then discharged through a discharge device and into contact with the solid particles. Discharge through the discharge device allows the bubbles to expand rapidly once outside the device. This expansion thoroughly atomizes the liquid. It has been found that the quantity of gaseous material that is required for the injection apparatus can be reduced relative to the amount of gas material that is required in other devices or methods for atomizing and dispersing liquids. In hydrocarbon processes such as fluidized catalytic cracking units, it is highly desirable to reduce the amount of steam that must be added since the steam places additional load on downstream product condensing facilities.

Accordingly in one embodiment, this invention comprises a method for contacting a stream of fluidized particles with a hydrocarbon stream. In this method, a gaseous component is first commingled with a liquid hydrocarbon stream which is then mildly mixed in a first mixing zone to obtain an evenly distributed and blended mixture of the gaseous component and hydrocarbon. The severity of the mixing is increased by passing the hydrocarbon and gaseous blend to a second mixing zone where the blend is mixed to homogenize the mixture and disperse fine gaseous bubbles throughout the mixture. The homogenized mixture is then discharged into a stream of fluidized solids through at least one discharge device which atomizes the liquid hydrocarbons into a mist of fine droplets and disperses the mist over the stream of fluidized particles.

This invention is also directed to an apparatus for contacting a stream of fluidized particles with a finely dispersed liquid. In one aspect, the apparatus comprises a pair of conduits. The first conduit transports a stream of fluidized particles. The second conduit comprises a liquid injector for transporting a mixture of liquid and gaseous component into the first conduit and provides means for mixing the liquid and gaseous streams under conditions of sequentially increased mixing severity. The second conduit has a partition defining two axially spaced regions. In the first region, means are provided for mild mixing and collectively blending the entire gaseous and liquid stream. The conduit transports the liquid and gaseous blend in a substantial linear flow path to the second or downstream region. The downstream region has means for vigorously mixing the liquid and gaseous blend into a homogeneous dispersion of liquid and fine bubbles. At least one discharge device communicates the downstream region with the interior of the first conduit. The discharge device has a restricted area that is sufficient to atomize liquid into a dispersion of fine droplets and an orientation that directs the dispersion into contact with the stream of fluidized particles flowing through the first conduit.

In another, more limited aspect, this invention is directed to an apparatus for introducing at least two fluid streams into a fluidized catalytic cracking riser. The apparatus includes an elongated riser conduit having a downstream end from which catalyst and hydrocarbons are discharged. A regenerator catalyst supply conduit is connected to the side of the riser conduit and supplies regenerated catalyst to the riser at a point upstream of the outlet end of the riser conduit. A portion of the riser conduit common with the intersection of the catalyst supply conduit forms a catalyst entry section of the riser. An inner conduit projects into the riser conduit and extends parallel to the center line of the riser to at least a point downstream of the catalyst entry section. This inner conduit conveys a stream of liquid hydrocarbons and at least one gaseous component into the riser and is separated by a perforated partition into at least one upstream region and one downstream region. The upstream region contains means for mildly mixing and collectively blending the hydrocarbons and gaseous component introduced therein. The downstream region contains another mixing zone of increased severity that vigorously mixes and homogenizes the hydrocarbons and gaseous component. One or more discharge devices located at the end of the inner conduit communicate the second region with the interior of the riser conduit and have a restricted area for atomizing the hydrocarbons into a dispersion of fine droplets and an orientation that directs the dispersion into contact with the catalyst. An outer conduit coaxially surrounds a downstream portion of the inner conduit and has an outlet and located within the catalyst entry section through which a second fluid enters the riser conduit.

Other aspects, objects and details of this invention are described in conjunction with the attached drawings.

BRIEF DESCRIPTION OF THE DRAWINGS

FIG. 1 is a cross-section of a liquid injector arranged in accordance with this invention.

FIG. 2 is a cross-section of the liquid injector taken over Section 2—2.

FIG. 3 is a plan view of the liquid injector of FIG. 1 taken in the direction of View 3—3.

FIG. 4 shows an alternate arrangement for a liquid injector designed in accordance with this invention.

FIG. 5 is a view of the liquid injector of FIG. 4 taken over Section 5—5.

FIG. 6 shows a modified form of the injector of FIG. 4.

FIG. 7 shows the injector of FIG. 6 in a riser conversion zone.

DETAILED DESCRIPTION OF THE INVENTION

In order to disperse a liquid into a dispersion of fine droplets, sufficient energy must be imparted to the liquid in order to break the liquid up into small droplets. The prior art has used an expanding gas or gaseous component such as steam in conjunction with another source of energy in order to break up the liquid. This other source of energy can consist of a high pressure drop for the gas and liquid mixture, or an orthogonal velocity component for the liquid mixture at or near the point of initial gas and liquid contact. In those cases where the gas and liquid are mixed and simultaneously discharged at high velocity, additional energy usually in the form of pressure drop must be supplied to the liquid and gas mixture in order to adequately mix and homogenize the mixture before discharge or to supply additional energy to make up for inadequate mixing so that a fine and uniform distribution of droplets will still be obtained outside the injector apparatus. It has been discovered that the total pressure drop across a liquid injector can be reduced and a good dispersion of fine liquid droplets can be obtained from the discharge outlet of the injector by blending and homogenizing the liquid of gas sequentially in stages of increased mixing severity.

As stated previously, liquid injectors designed to distribute a dispersion of fine droplets in accordance with this invention rely on a gaseous medium to ultimately break up the liquid into fine droplets. The injector of this invention is particularly suited for hydrocarbon conversion wherein the liquid will be a stream of hydrocarbons and the gaseous medium will be steam, lighter hydrocarbons, i.e., hydrocarbons that have a boiling point substantially less than the boiling point of the liquid hydrocarbons, hydrogen, or a combination of the above. Thus, the feed distributor will typically distribute liquid hydrocarbons which enter the injection device at a temperature below their boiling point but at a temperature above the boiling point of the steam or gaseous hydrocarbons that enter the injection device along with the liquid. Whatever the relative composition of the liquid and gaseous components, it is essential that a minimum quantity of gaseous material at least equal to 0.2 wt. % of the combined liquid and gaseous mixture, is commingled with the liquid entering the injection device.

As the gaseous medium and liquid, in this case steam and hydrocarbons, enter the piping to the liquid injector apparatus they tend to remain segregated. By this invention, the steam and hydrocarbon mixture passes through the first mild mixing zone which blends the hydrocarbon and steam mixture into a relatively uniform hydrocarbon and steam stream. By substantially uniform, it is meant that any major segregation between the liquid and gaseous component that would tend to deliver more liquid or gaseous medium to one section or another of the subsequent mixing stage have been eliminated. Since this blending is mild, the pressure drop across this zone will not normally exceed 10 psi.

The liquid and gaseous mixture is then conveyed, in a manner that will not resegregate the liquid and gaseous components, to at least one more intensive mixing stage that vigorously mixes the liquid and gas into a homogeneous mixture of liquid with finely distributed bubbles of the gaseous medium throughout the liquid. Preferably, at least the last stage of intensive mixing will use a series of small orifices to divide the liquid and gas blend into a multiplicity of streams and initiate the gas dispersion. In order to achieve the more vigorous mixing, this stage will usually require a higher pressure drop than the previous stage. Nonetheless, total pressure drop through this stage will not normally exceed 20 psi. In the case of oil and steam, this homogeneous mixture will approach the form of an emulsion.

The homogeneous mixture of liquid and finely dispersed gas bubbles pass through one or more discharge devices as it exits the injector. The discharge devices at least direct the flow of liquid and the gaseous medium, and can also be designed to increase dispersion of the gaseous medium. Thus, suitable discharge devices range from simple orifice holes or pipe nozzles to commercially designed spray nozzles. As the liquid and gas leave the discharge devices, bubbles rapidly expand to break up the surrounding liquid into a dispersion of fine droplets which retain the trajectory imparted to the liquid as it left the discharge devices. The formed droplets become interspersed with solid particles that are suspended about the outlet of the injection device.

Figure 1:
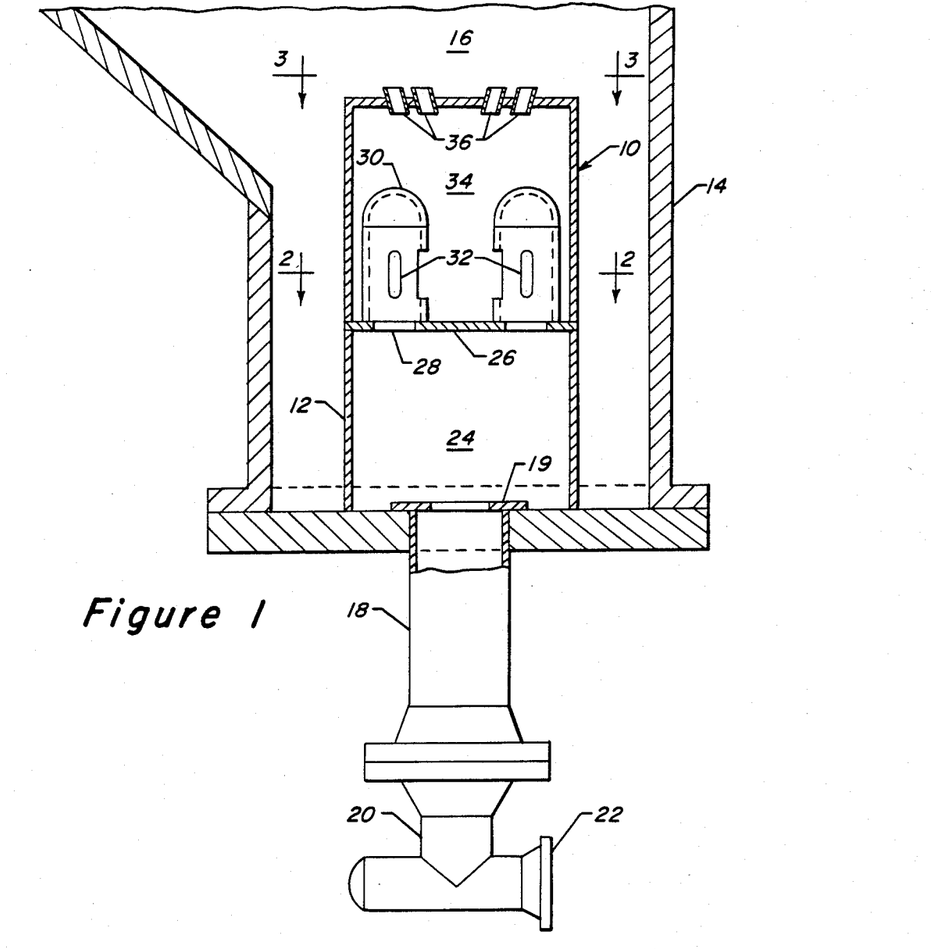

A specific injector device for providing the sequential stages of increased severity mixing is shown in FIG. 1. The injector device of FIG. 1 is particularly suited for fluid catalytic cracking units wherein hydrocarbons are cracked in the presence of finely divided or fluidized catalyst particles. The feed injector device will be further described in the context of a fluidized catalytic cracking unit, however, those skilled in the art will recognize that this invention could find application in various liquid and solid contacting processes or applications.

Focusing then on FIG. 1, the configuration of the feed injector 10 conforms to the readily recognizable appearance of an FCC feed distributor located at the bottom of a riser. Although FIG. 1 shows the feed injector positioned at the bottom of the riser, feed injector placement is not limited to a bottom riser location. The injector may be located at various points along the length of the riser and may enter the riser through its sidewall as the bottom. The feed distributor 10 has an inner conduit 12 which resides in the confines or riser conduit 14. Riser conduit 14 defines a riser conversion zone 16 wherein solid particles in the form of FCC catalyst are fluidized. External conduit 18 extends outside riser conduit 14. In this case, distributor 10 also includes a T-junction 20 located upstream of external conduit 18.

Liquid hydrocarbons and a gas medium, in this case steam, enter T-junction 20 through inlet 22. The hydrocarbon is commingled with the steam in a quantity equal to 0.2 to 5 wt. % of the liquid hydrocarbon, with 0.5 to 2 wt. % being a preferred steam concentration. T-junction 20 serves as a first mild mixing zone for blending the commingled hydrocarbon and steam into a relatively uniform mixture. Blending is accomplished by the flow discontinuity of T-junction 20 which for hydrocarbon and steam mixtures entering the T at velocities greater than 30 ft/sec will introduce sufficient turbulence to accomplish the desired blending. The configuration of the T-junction also serves the important objective of collectively blending the entire flow of hydrocarbons and steam that are charged to injector 10. Collective blending, as opposed to dividing and mixing the stream, is essential so that no localized variation of hydrocarbon and steam occurs in the mixture as it leaves junction 20. The mild mixing that takes place in the T-junction pressure drop will usually not exceed 5 psi.

As the hydrocarbon and steam mixture moves up through conduit 18 and into upstream chamber 24, it remains a substantially uniform blend. The hydrocarbon and steam mixture enters chamber 24 by passing through an orifice plate 19. Orifice plate 19 directs the mixture into impingement with a partition 26 thereby providing another stage of mild mixing. Chamber 24 is bordered on its top side by partition 26 having openings 28 which lead to the next stage of mixing. It is essential that the oil and gas blend be transferred from the mild mixing stage or stages, in this case T-junction 20 and orifice plate 19, to the succeeding stage or stages of vigorous mixing in substantially axial or unidirectional flow. Axial or unidirectional flow primarily means that bends or obstructions, serving to introduce tangential velocities, to the hydrocarbon and steam blend should be avoided. Tangential velocities imparted to the entire hydrocarbon and steam blend serve to resegregate the hydrocarbon and steam. If resegregation occurs, the resulting maldistribution may deliver different ratios of hydrocarbon and steam to the different openings 28. Such a maldistribution can interfere with mixing in the subsequent mixing stage. The arrangement of injector 10 avoids resegregation by providing a linear flow path between T-junction 20 and partition 26. It should be noted that substantially axial flow is only meant to prohibit asymmetric flow arrangements between the mild mixing zone and subsequent stages of mixing. In the arrangement of distributor 10, the expansion of chamber 24 relative to the interior conduit 18 and the off center location of openings 28 do not promote resegregation but introduce additional turbulence that further mixes the hydrocarbon and steam blend. Although orifice plate 19 and T-section 20 provide distributor 10 with two zones of mild mixing, either the T-section or orifice plate by itself can provide adequate mild mixing.

The hydrocarbon and gas mixture passes through openings 28 into the next zone of mixing. The next zone of mixing consists of mixing caps 30 and the jets produced by fluid passing through slots 32 which are defined by caps 30. Mixing caps 30 are located in a downstream chamber 34. FIG. 2 depicts at plan view of mixing caps 30 positioned over each of openings 28 and the arrangement of slots 32. Each of slots 32 is orientated with a projection that intersects the projection of a corresponding slot on a different cap 30. As a portion of the hydrocarbon and steam blend flows into one of caps 30 and a yet smaller portion flows out of one of slots 32, it impacts with another portion of the hydrocarbon and steam blend that is discharged from a slot having an intersecting projection therewith. In this fashion, the intersecting projections of the slot and the hydrocarbon and steam flowing therethrough create an impact zone. This impact zone vigorously mixes the hydrocarbon and steam blend to divide the steam and shears the liquid into a homogeneous distribution of liquid and microbubbles. Although in this case, impingement of the hydrocarbon liquid upon itself is the vehicle of vigorous mixing, the sequential increase of mixing severity may be accomplished by any means that will shear the liquid component of the mixture and divide the gaseous component of the mixture. Multiple slots 32 also encourage the dispersion of the steam into the oil by breaking the mixture into a series of smaller streams. Slots 32 are designed for an exit velocity of hydrocarbons and steam of about 50 feet per second. Passage of the gaseous component and liquid through the mixing zone at the beforementioned velocities produces a total pressure drop of approximately 10 psi.

Once the hydrocarbon and steam mixture has gone through the sequential stages of mixing provided by T-junction 20, plate 19 and caps 30, mixing and homogenation of the mixture is essentially complete and it is discharged through discharge devices, comprising discharge nozzles 36, which communicate chamber 34 with riser conversion zone 16. Although the turbulence associated with passing the hydrocarbon and steam mixture to the upper portion of chamber 4 and redirection of the mixture into discharge nozzles 36 could provide further mixing, additional mixing after the impact zone is usually not beneficial. The most likely result of such further mixing is coalescence of the microbubbles into larger bubbles prior to their exit through nozzles 36. Any increase in the size of the bubbles decreases the degree of atomization of the liquid as it is discharged through nozzle 36. Therefore, it is advantageous to design chamber 3 such that it minimizes residence time for the hydrocarbons and steam passing therethrough and minimizes mixing between the vigorous mixing zone and discharge nozzles 36.

Figure 3:
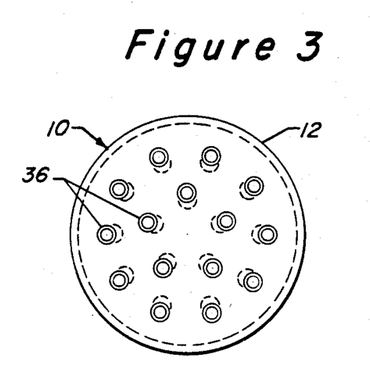

Discharge nozzles 36 comprise a discharge zone which serves dual purposes of atomizing the liquid and directing the liquid droplets over riser conversion zone 16. FIG. 3 depicts nozzles 36 in a directionally orientated array that collectively have a reduced cross-sectional area relative to a cross-section of chamber 34. The reduced area of the nozzles offers a flow restriction that increases the flow velocity of the fluid exiting the nozzles. Subsequent expansion of the microbubbles present in the hydrocarbon and steam mixture atomizes the liquid as it passes out of the nozzles 36. Typically, passage of the liquid and gas mixture through the discharge zone imposes a pressure drop of about 20 to 40 psi. This pressure drop is considerably less than the pressure drop that would be required to completely atomize the oil if the gaseous medium was not highly dispersed throughout the oil by the sequential stages of mixing hereinbefore described. Velocity of the hydrocarbon and steam mixture leaving the nozzles is in the range of about 50 to 125 feet per second with a velocity in the range of 75 to 100 being preferred. This range of velocities contrast sharply with other atomizing devices which need exit velocities in the range of 200 ft/sec or higher for good atomization. A lower velocity is preferred since it requires less pressure drop. In addition, high velocity jets impart momentum to the solids which are contacted thereby. The momentum causes additional collisions between the solid particles and leads to attrition damage of the solid particles as well as erosion damage to the equipment. The lower range of velocities hereinbefore mentioned is preferred because it avoids such damage while still imparting sufficient momentum to the fluid to provide a good distribution of the droplets over a wide area of solids.

It is readily understood from the foregoing description that the degree of atomization or the size of droplets formed is to a large extent dependent on the amount of pressure drop that can be tolerated through the sequential mixing stages and the discharge zone. Therefore, while this distributor has been designed to operate at lower pressure drops and with reduced amounts of gaseous medium, the pressure drop and or the amount of gaseous medium can be increased to achieve any increased degree of atomization that is required.

Figure 4:
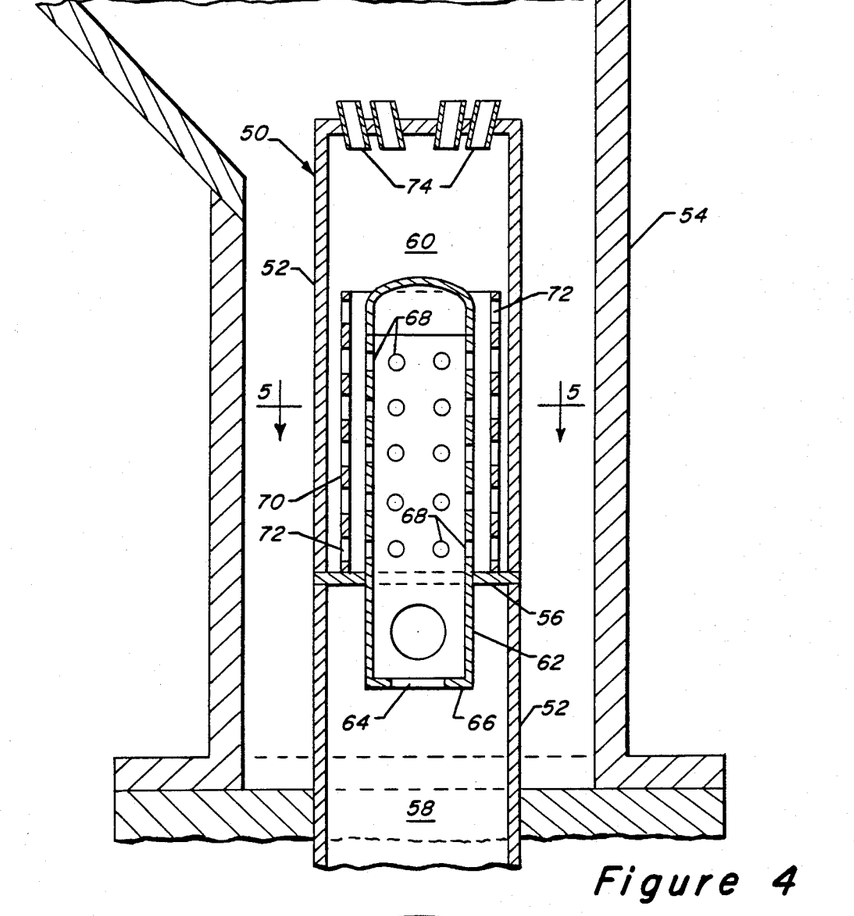
Figure 5:
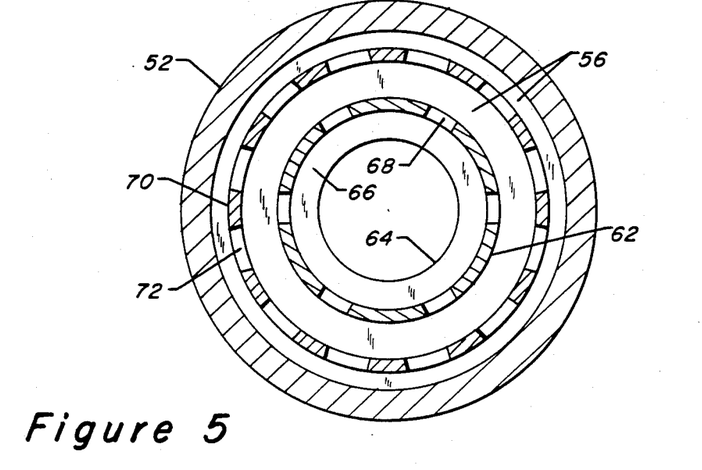

FIG. 4 illustrates an alternate arrangement for a feed distributor of this invention having a mild mixing zone and a vigorous mixing zone that differ from those shown in FIG. 1. A liquid injector 50 as shown in FIG. 4, has a continuous conduit 52 that extends into the interior of a riser conduit 54. A partition 56 divides the interior of conduit 52 into an upstream portion 58 and a downstream portion 60. A mixing conduit 62 pierces partition 56 and projects into upstream chamber 58 and downstream chamber 60. As commingled hydrocarbon and steam enter downstream chamber 58, it is communicated to the interior of mixing conduit 62 through a series of large apertures 64 defined by the upstream extension of mixing conduit 62. The series of apertures 64 consist of one aperture in a bottom closure plate 66 and a number of equally spaced apertures located about the side wall of conduit 62. Apertures 64 have inwardly converging projections that intersect at a common point and direct all of the hydrocarbon and steam mixture entering conduit 62 into a common collection point to blend the hydrocarbon and steam mixture and provide a zone of mild mixing. The blended mixture of hydrocarbon and steam flows out of conduit 62 through a series of small apertures 68 which divide the mixture into a multiplicity of smaller streams that initiate dispersion of the steam through the oil. Apertures 68 direct the hydrocarbon and gas mixture into an impingement medium which in this case consists of a perforated cylindrical tube 70. Together the holes 68, defined by conduit 62, and tube 70 provide a zone of vigorous mixing in the form of an impingement area. As shown in FIG. 5, the perforations 72 of tube 70 do not coincide with aperture 68. Therefore apertures 68 direct the mixture of hydrocarbon and steam into imperforate portions of tube 70. Impact of the hydrocarbon and steam mixture with the tube wall again shears the liquid and breaks up the steam into a dispersion of microbubbles throughout the liquid hydrocarbon. The perforations of tube 70 have a greater number of open area than the apertures of 68 so that hydrocarbons and gas passing through perforation 72 will not impact the interior of conduit 52 with substantial momentum. The homogenized mixture of hydrocarbons and steam passing out of apertures 68 flows upwardly through annular regions to either side of tube 70 and into downstream chamber 60. Hydrocarbons and gas pass through downstream chamber 60 and out discharge nozzles 74 which again atomize and distribute the dispersion of fine droplets as hereinbefore described. In this arrangement, sequential mixing of increased severity is provided principally by a single mixing conduit. In and out flow through the conduit conveniently provides collective mixing for blending the entire flow of hydrocarbon and steam and impingement for increased severity mixing. The single mixing conduit allows sequential mixing to be achieved with a relatively small amount of hardware. As a result, all the mixing ca be achieved in that portion of the injector that is located within the riser conversion zone.

Figure 6:
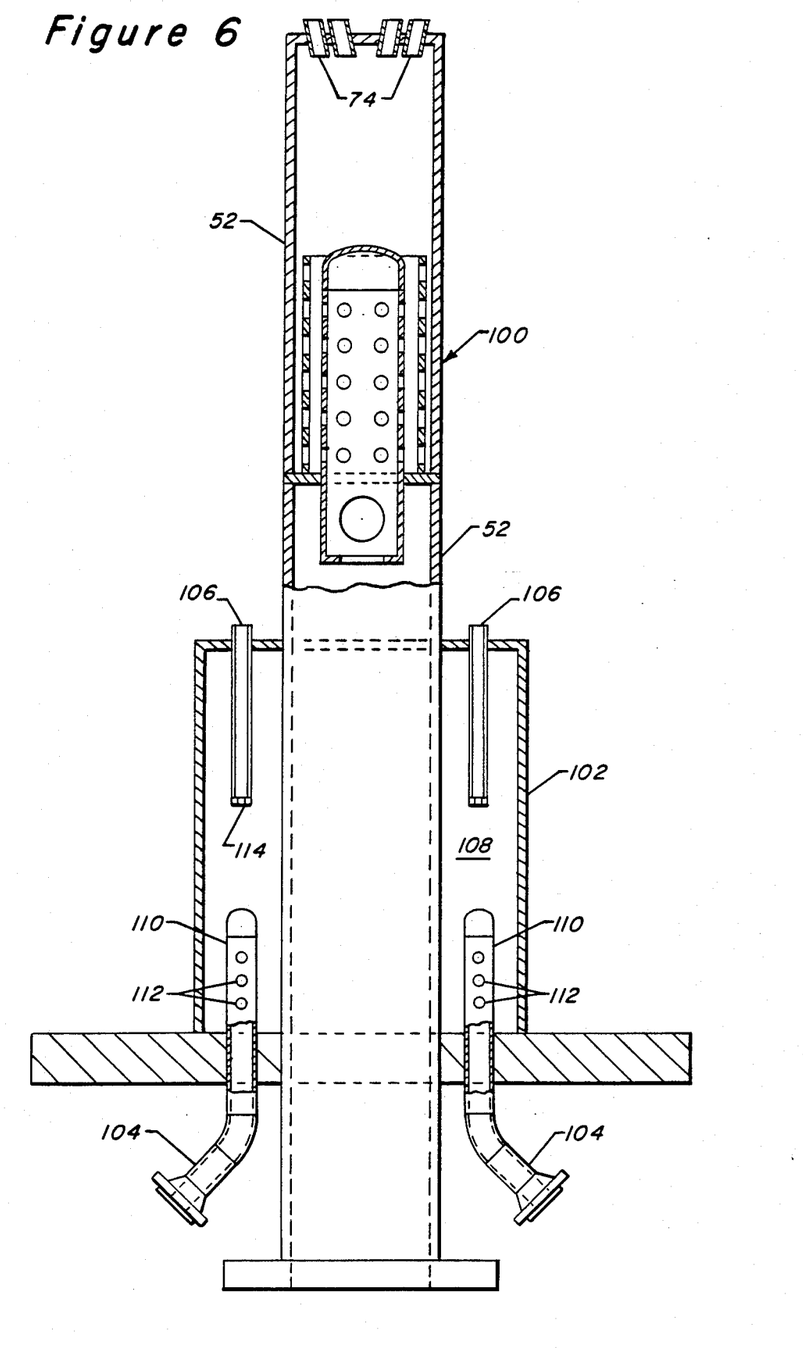

In a highly preferred embodiment, the liquid injection apparatus of this invention includes provision for injecting fluids into the riser conversion zone at two discrete locations. FIG. 6 illustrates a modified injector 100 that incorporates an annular conduit 102 for receiving another fluid such as a secondary feed or fluidizing medium through a set of inlet nozzles 104. Fluid entering through nozzles 104 is discharged through secondary outlets 106 at a location below or downstream outlets 74 of conduit 52. Preferably, the fluid entering nozzles 104 is a hydrocarbon and gaseous mixture. An annular area 108 defined by annular conduit 102 and conduit 52 contains flow devices for again dispersing the liquid hydrocarbon into fine droplets. As the fluid enters annular area 108, bayonet ends 110 of nozzles 104 direct fluid laterally through a series of holes 112 to mix liquid and gaseous components. The mixed liquid and gaseous components pass through an orifice 114, at the inlet of nozzle 106 which atomizes the liquid into droplets before it passes out of nozzle 106. When a mixed phase stream of liquid and gaseous material enters nozzle 104, it usually has a much higher concentration of gaseous material to liquid than the liquid and gaseous material entering conduit 52.

Figure 7:
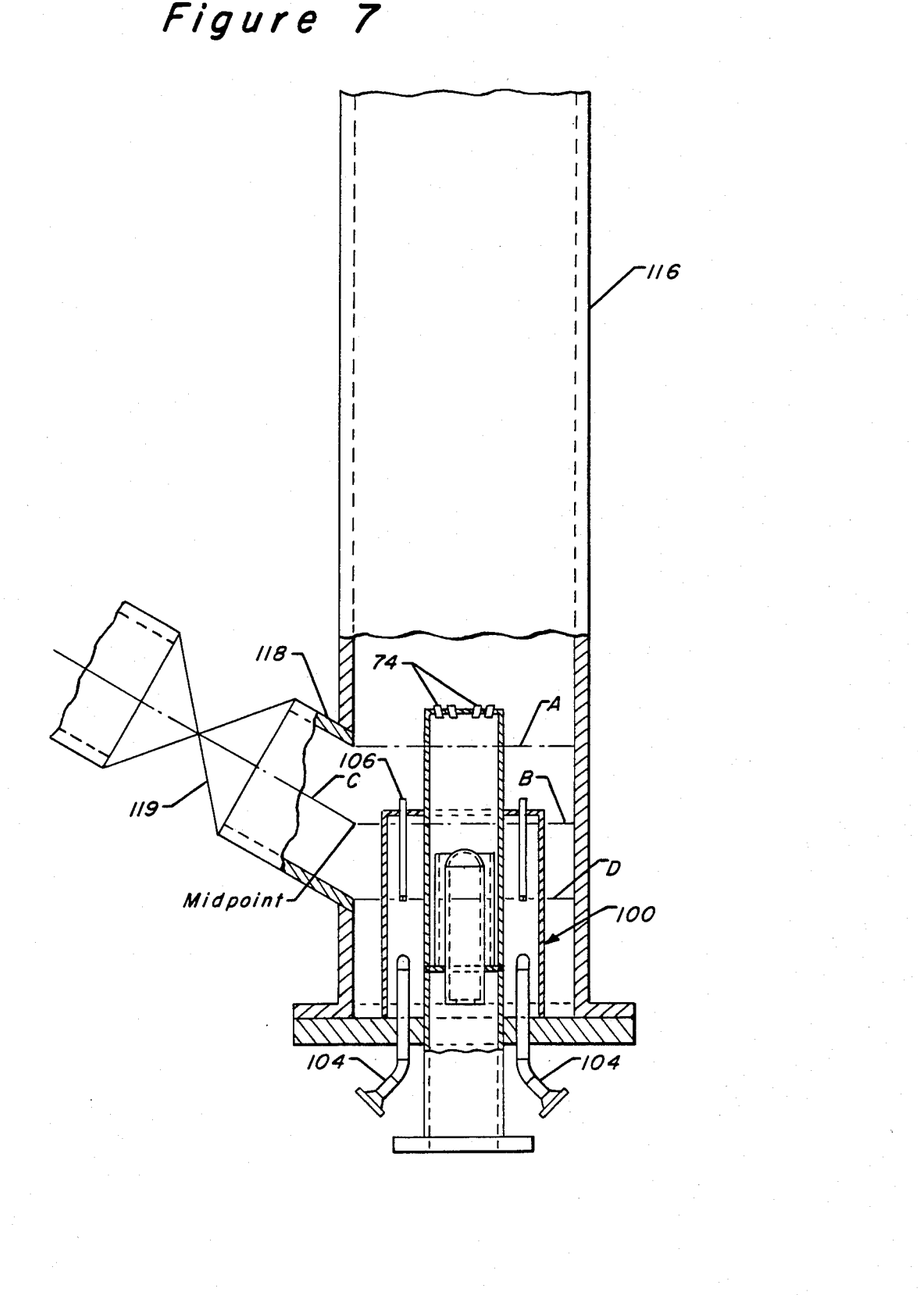

The operation of the injector of FIG. 6 can be more fully appreciated in conjunction with the operation of an FCC riser. FIG. 7 shows the injector of FIG. 6 in an FCC riser conversion zone. The conversion zone has a reactor riser conduit 116 containing the injector 100, and a regenerated catalyst conduit 118 having a catalyst flow control valve 119. As the process is carried out, regenerated catalyst from conduit 118 first contacts the fluid entering the riser conversion zone via outlets 106. As this first fluid and catalyst mixture ascends upward or upstream, it is contacted with a feed entering from discharge nozzles 74. Both process streams and the catalyst continues upward through riser 1 until it is discharged into a disengaging vessel (not shown) at the upper end of the riser.

The relative location of discharge nozzles 72 and outlets 106 with respect to the opening of the catalyst conduit is an important feature of this embodiment. The intersection of the catalyst conduit and the riser conduit define a catalyst entry section which is bounded on the upper or downstream side by dashed line A and on its lower or upstream side by dashed line B, with both lines having a perpendicular orientation to the riser centerline. (For convenience the boundaries of catalyst entry section and conduit openings will be described by the terms upper or lower and above or below, the usage of which is not meant to limit the riser to a vertical configuration). Initial acceleration and fluidization of the catalyst is primarily accomplished by fluid entering through the outlets 106. At the location of initial catalyst contact with the fluid, there is a great deal of turbulence and backmixing that occurs. Backmixing will adversely affect reactions in the riser resulting in overcracking and undesirable reaction products. Turbulent conditions also greatly accelerate erosion of equipment due to the abrasive nature of FCC catalyst. By performing this initial mixing with fluid entering through the outlets 106, a hydrocarbon feed may be added through the nozzles 74 so that the adverse effects of the turbulence and backmixing may be eliminated or minimized with respect to the feed entering thereby.

The disadvantages associated with poor initial catalyst mixing may be eliminated by injecting a fluidizing medium into the riser conduit through nozzles 106. This will allow the catalyst to achieve a more uniform flow profile before contacting a feed which is introduced through the nozzles 74. Suitable fluidizing mediums include steam, light gaseous hydrocarbons or feedstocks requiring longer residence times or increased catalyst activity. From the standpoint of fluidization, the introduction of a fluidizing medium in the manner of this invention will eliminate erosion that has been associated with the addition of fluidizing medium in other locations of the riser. The location of the outlets 106 within the region of the standpipe opening takes the high turbulence associated with initial mixing out of the extreme upstream end of the riser thereby minimizing the potential for erosion in this zone. In the past, steam or other gaseous mediums were injected in the lowermost portion of the riser to provide additional fluidization to the catalyst entering the riser. However, injecting steam in the bottom portion of the riser results in erosion of pipes, nozzles and other components located in the lowermost portion of the riser. While it is possible to inject fluidizing medium at a more downstream location within the riser, i.e., below the catalyst entry section by means of pipe extensions from the riser end enclosure or nozzles inserted into the side of the riser, these methods interfere with the flow path of the catalyst over the riser cross-section and place additional pipe components, which are subject to erosion, within the path of the moving catalyst. Conversely, by the apparatus of this invention, fluidizing medium can be added to a downstream location within the riser without the use of pipe extensions or additional inlet nozzles in the side of the riser.

The lower portion of the riser is extremely susceptible to erosion due to the dissipation of downward particle momentum that occurs in this region. Effecting a major addition of fluidizing medium in the catalyst entry section reduces turbulence by allowing mixing in a less confined region of the riser. Moreover, turbulence is further reduced since downward momentum of the catalyst is dissipated in a layer of relatively stagnant catalyst which forms below outlets 106. Therefore, for purposes of minimizing erosion, the preferred location for the outer conduit outlet is at or above the midpoint of the catalyst conduit opening which is defined by the intersection of catalyst conduit centerline C with the projection of riser wall as given by line D (see FIG. 7).

The limitation on the downstream location of the outlets 106, i.e., below line A, minimizes the requirements of fluidizing medium. If the outlets were located above the catalyst entry section, it would be necessary to greatly increase the volume of fluidizing medium in order to provide the lift necessary to transport the catalyst away from the opening of the catalyst entry section.

Nozzles 74 are above the catalyst entry section, i.e., at or above line A. Therefore, the feed entering the riser through the nozzles 74 will be at a point downstream of the outlets 106. Factors affecting the downstream location of nozzles 74 are: the necessary riser residence time for the feed entering through nozzles 74; the overall length of the feed injector; and the provision of an adequate distance between outlets 106 and nozzles 74 such that fluidizing medium entering through outlets 106 can distribute and evenly disperse the catalyst into a dilute phase before the catalyst reaches nozzles 74.

An additional advantage of using an injector capable of adding feeds at two locations is the possibility of adding feedstocks having different properties. Suitable feedstocks for outlets 106 would be those requiring increased catalyst activity or contact time to effect the desirable cracking reactions or those feed components where a separate cracking zone is desirable. Examples of hydrocarbons for this purpose are straight run or cracked naphthas, or paraffinic raffinates. Similarly, light hydrocarbons may be added at this point to effect passivation of the catalyst as taught in U.S. Pat. No. 4,479,870. Thus, this invention also allows a dual function lift gas to be introduced into the riser section in a highly effective manner.

What is claimed is:

1. A method for contacting a suspension of fluidized particles with a hydrocarbon stream said method comprising:
   (a) commingling liquid hydrocarbons with a gaseous material to form a commingled stream of liquid hydrocarbons and gaseous material;
   (b) passing said commingled stream to a mild mixing zone and mildly mixing said liquid hydrocarbons and said gaseous material in the absence of substantial quantities of particles to form a mixture having a distribution hydrocarbon and gaseous material of increased uniformity relative to said commingled stream;
   (c) passing said mixture from said mild mixing zone to a vigorous mixing zone and vigorously mixing said mixture in the absence of substantial quantities of particles by dividing said mixture plurality of discrete streams and directing the projection of each of said on streams into impingement with an impact medium, said impact medium comprising at least one of an imperforate wall section or another of said discrete stream homogenize said hydrocarbons and said gaseous material; and
   (d) passing said mixture from said vigorous mixing zone to a discharge zone and discharging said mixture through a discharge zone into a stream of fluidized particles, said discharge zone including at least one discharge device for atomizing said liquid hydrocarbons into a mist of fine droplets and dispersing said mist over said suspension of fluidized particles.

2. The method of claim 1 wherein the pressure drop across said mild mixing zone does not exceed 10 psi.

3. The method of claim 1 wherein the pressure drop across said vigorous mixing zone does not exceed 20 psi.

4. The method of claim 1 wherein the pressure drop across said discharge zone does not exceed 40 psi.

5. The method of claim 1 wherein said gaseous material comprises steam in an amount equal to 0.5 to 2 wt. % of the hydrocarbon and steam mixture.

6. The method of claim 5 wherein said mixture leaves said discharge zone at an average velocity of less than 100 ft/sec.

7. The method of claim 1 wherein said discharge zone and said vigorous mixing zone are contained within a riser conduit.

8. The method of claim 7 wherein said mild mixing zone is located within said riser conduit.

9. A method for contacting stream of fluidized particles in a riser conduit with a hydrocarbon dispersion, said method comprising:
   (a) commingling hydrocarbons and a gaseous material outside said riser conduit to form a commingled stream of said hydrocarbons and gaseous material;
   (b) passing said commingled stream to a mild mixing zone and mixing said commingled hydrocarbons and gaseous material in the absence of substantial quantities of particles to obtain a mixture having an increased uniformity of hydrocarbons and gaseous material relative to said commingled stream, said mixing zone having a pressure drop less than 10 psi; and
   (c) passing said mixture in substantially axial flow from said mild mixing zone to a vigorous mixing zone;
   (d) homogenizing said mixture in said vigorous mixing zone in the absence of substantial quantities of particles by dividing the mixture into a plurality of discrete streams and directing the projection of each of said discrete streams into impingement with an impact medium, said impact medium comprising at least one of an imperforate wall section or another of said discrete streams, said vigorous mixing zone having a pressure drop of less than 20 psi; and
   (e) passing said mixture from said vigorous mixing zone to a discharge zone and discharging said mixture through said discharge zone into a stream of fluidized solids, said discharge zone having a plurality of discharge device for atomizing said liquid hydrocarbons into a mist of fine droplets and dispersing said mist over the cross-section of said riser conduit.

10. The method of claim 9 wherein said vigorous mixing zone directs said streams into each other.

11. The method of claim 9 wherein said discharge devices comprises nozzles having restricted openings.

* * * * *

UNITED STATES PATENT AND TRADEMARK OFFICE
CERTIFICATE OF CORRECTION

PATENT NO. : 4,861,459
DATED : August 29, 1989
INVENTOR(S) : Cetinkaya et al.

It is certified that error appears in the above-identified patent and that said Letters Patent is hereby corrected as shown below:

In Column 11, line 24: After "mixture", insert --into a--;

line 29: After "stream", insert --s, to--.

Signed and Sealed this

Twenty-first Day of May, 1991

Attest:

HARRY F. MANBECK, JR.

Attesting Officer

Commissioner of Patents and Trademarks